United States Patent [19]
Clark

[11] 3,838,507
[45] Oct. 1, 1974

[54] ANIMAL NAIL CLIPPER

[76] Inventor: Richard N. Clark, 28833 Glencastle, Farmington, Mich. 48024

[22] Filed: Aug. 3, 1972

[21] Appl. No.: 277,913

[52] U.S. Cl............................ 30/29, 30/242, 30/335
[51] Int. Cl............................................. B26b 13/26
[58] Field of Search.......... 30/5, 113, 123 R, 26–29, 30/182–185, 241–243, 335, 336; 81/362, 363; 128/306, 309, 313

[56] References Cited
UNITED STATES PATENTS

| | | | |
|---|---|---|---|
| 165,402 | 7/1875 | Bates | 30/182 |
| 1,347,651 | 7/1920 | Nauth | 30/182 X |
| 1,927,234 | 9/1933 | Hawkins | 30/184 X |
| 2,820,292 | 1/1958 | Bouten | 30/182 |
| 2,955,354 | 10/1960 | Laing | 30/29 |

Primary Examiner—Al Lawrence Smith
Assistant Examiner—Gary L. Smith
Attorney, Agent, or Firm—Barnes, Kisselle, Raisch & Choate

[57] ABSTRACT

An animal nail clipper with a pair of pivotally connected handles and a nail holder. A blade actuated by squeezing the handles slides over the nail holder to cut a nail received therein. The blade is removable from the clipper and is operably connected with one of the handles by a link with a latch releasably engaging the blade. A blade removal pin also serves as a retainer for maintaining the clipper in collapsed condition for shipment.

27 Claims, 11 Drawing Figures

3,838,507

1

ANIMAL NAIL CLIPPER

This invention relates to an animal nail clipper of the type used in trimming the nails of an animal such as dogs and cats and more particularly to a nail clipper with a removable blade.

Objects of this invention are to provide an improved animal nail clipper and an improved cutting blade therefor in which the cutting blade can be readily removed and replaced by hand without disassembly of the clipper, which is of economical manufacture and assembly, has improved performance and a long useful life.

These and other objects, features and advantages of this invention will be apparent from the following description, appended claims and accompanying drawings in which:

Figure 1:
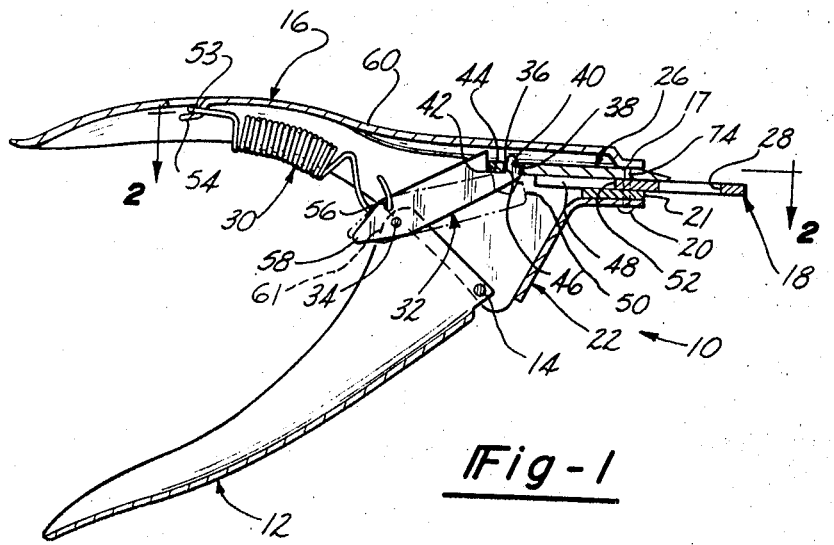
FIG. 1 is a side view in vertical section of an animal nail clipper embodying the present invention.
Figure 3:
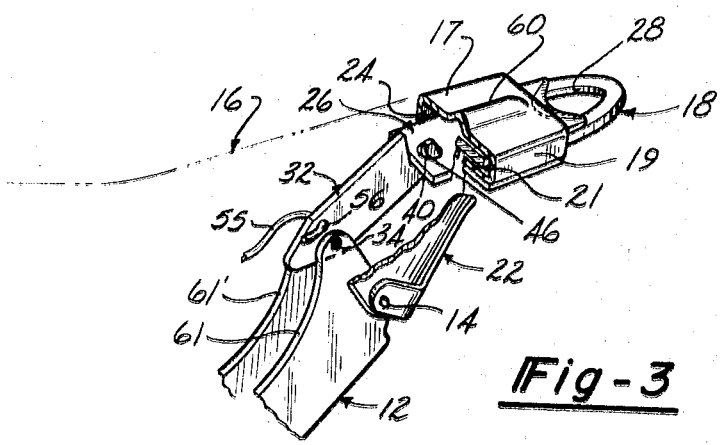
FIG. 3 is a fragmentary perspective view of the nail clipper.
Figure 5:
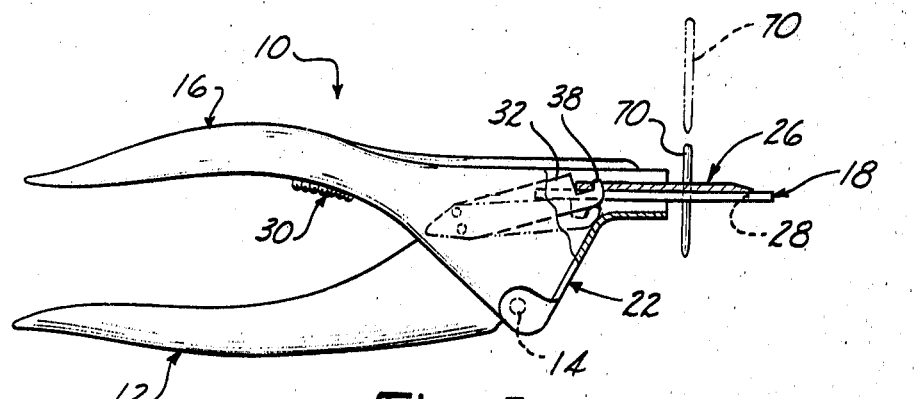

Referring to the drawings, FIGS. 1 and 5 illustrate an animal nail clipper 10 embodying this invention with a first or lower handle 12 pivotally connected by a pin 14 to a second or upper handle 16 to which a nail holder 18 is secured by screws 20. A cover 22 is also secured to the lower front portion of handle 16 by screws 20. As shown in FIG. 3, the forward portion of handle 16 has a top wall 17, two opposite side walls 19 and two inturned flanges 21 which form a generally rectangular passage 24 in which holder 18 is stationarily mounted along with a cutting blade 26 which is slidably received in generally overlapped relation with nail holder 18 to slide against the inside surfaces of walls 17, 19 and 21. Nail holder 18 has a generally tear drop shaped aperture 28 therethrough in the portion thereof protruding outwardly beyond cover 22 to receive and position an animal nail to be cut by blade 26 as it passes across opening 28 when the clipper is manually actuated by

2 squeezing of handle 12 toward handle 16 against the bias of a tension coil spring 30. A nail clipper as thus far described is shown in U.S. Pat. No. 2,955,354, issued Oct. 11, 1960, which is incorporated herein by reference and hence will not be described in greater detail.

Figure 2:
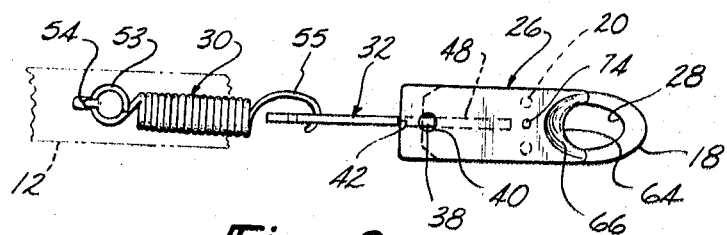
FIG. 2 is a horizontal fragmentary sectional view on line 2—2 of FIG. 1.

As shown in FIGS. 1–3, and in accordance with one principal feature of this invention, blade 26 is releasably connected to handle 12 for reciprocating movement in passageway 24 by a push-pull link 32 pivotally connected to handle 12 by a pin 34. Link 32 has a notch 36 adjacent its front end forming a projection or hook 38 which extends through a circular hole 40 near the rear edge of blade 26. Notch 36 is defined by a pushing surface 42, a bottom bearing surface 44 and a pulling surface 46 which engage the portion of blade 26 between hole 40 and the rear edge of the blade to reciprocate blade 26 when handle 12 is pivoted with respect to handle 16.

As shown in FIGS. 1 and 2, the front portion of link 32 is received in a slot 48 in the rear portion of nail holder 18 to permit movement of the forward portion of link 32 past the rear edge of holder 18 as the link is extended and retracted. An abutment surface 50 on the front edge of hook 38 is adapted to bear on the terminal end 52 of slot 48 to provide a positive stop limiting the extent of forward travel of cutting blade 26. Lever 32 is yieldably urged into latching engagement with blade 26 by spring 30 which has a hook 53 at one end of spring 30 received over a struck-down tab 54 on handle 16 and another hook 55 at the other end of spring 30 received in a hole 56 through lever 32. Link 32 can be pivoted to disconnect from blade 26 by applying force to its free end 58 to pivot the link against the bias of spring 30 about the axis of pin 34. To reduce frictional wear and provide a cutting action requiring a minimum actuation force, both link 32 and blade 26 are made of hardened steel. Preferably, a rib 60 in handle 16 provides a groove in passageway 24 which insures adequate clearance for link 32 so that it does not bear on handle 16 when the clippers are manipulated. Also, hole 56 is positioned far enough from pin 34 so that hook 55 does not contact the spaced edges 61 and 61' (FIGS. 1 and 3) of handle 12 during any of the pivotal movement of link 32 even when the same is being unlatched from the blade.

Figure 4:
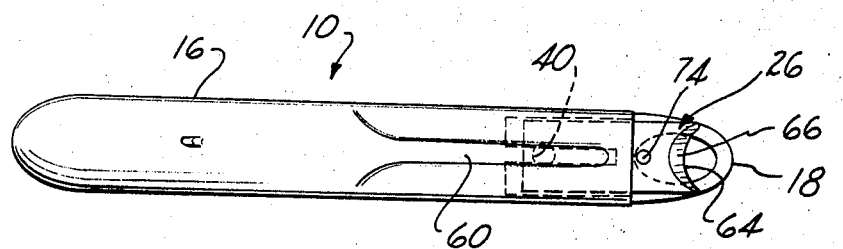
FIGS. 4 and 5 are plan and side views respectively of the nail clipper shown with its handles partially closed.
Figure 6:
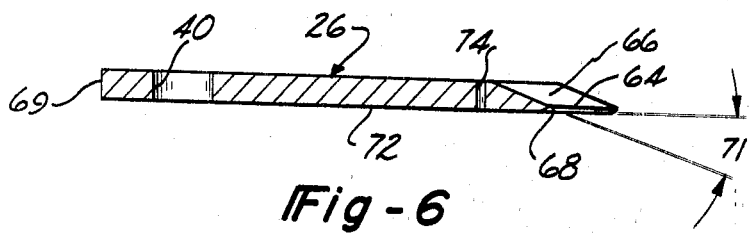
FIG. 6 is an enlarged sectional view of one embodiment of the improved blade of the nail clipper.

As shown in FIGS. 4–6, blade 26 of the present invention has a cutting edge 64 which is preferably formed by generally crescent shaped surfaces 66 and 68. Preferably, surface 66 forms an included angle 71 with the bottom face 72 of blade 26 not substantially greater than 21° The cutting edge with a 21° included angle makes it easier to cut heavier nails, but provides less metal thickness for the blade so that it must be hardened, honed and, if desired, buffed to provide a cutting edge having sufficient strength so that it will not roll over in use. After the cutting edge is hardened and initially honed, it may be buffed to increase its strength sufficiently to prevent rolling over in use. However, excellent results have been obtained without the final buffing operation if blade 26 is made of cold rolled annealed spring steel type C1074 with a hardness between 57 and 60 Rockwell C (on D scale), in conjunction with the preferred blade angle of 21° and other features described previously and hereinafter.

In using clipper 10, an animal nail to be trimmed is inserted through nail holder 18. Handles 16 are manually squeezed so that handle 12 pivots about the axis of pin 14 toward handle 16, thereby via pin 34 and link 32 extending blade 26 to shear or cut off the nail received in holder 18. Pivotal movement of handle 12 toward handle 16 causes pin 34 to push link 32 away from spring 30, thereby increasing the bias of spring 30 acting via hole 56 on link 32. This imparts an increasing couple on link 32 tending to pivot the link counterclockwise (as viewed in FIG. 1) about pin 34. Hook 38 thus is always biased into hole 36 so that link 32 cannot become disconnected from blade 26 even as it becomes fully extended. When link 32 is fully extended (not shown), the front edge of the hook or projection 38 is received in slot 48 of nail holder 18 and abuts stop 52 to limit further extension of blade 26. When handles 12 and 16 are released, the bias of spring 30 pivots handle 12 about pin 14 away from handle 16 to thereby retract link 32 and blade 26 to the position thereof shown in FIG. 1.

Blade 26 can be removed from clipper 16 without the use of any tools by applying sufficient force with one finger on the free end 58 of link 32 to pivot the link against the bias of spring 30 and thereby disengage the other end 38 of link 32 from blade 26. The blade can then be manually pulled out through the front end of passage 24, or pushed out by squeezing handles 12 and 16 together with the leading edge of projection 38 positioned behind the rear edge 69 of blade 26. Blade 26 can be replaced or a new blade installed in clipper 10 by inserting the blade rear end first through passage 24 and manipulating link 32 by applying pressure to free end 58 thereof to raise projection 38 clear of the rear of the blade until registered with hole 40 and then releasing the pressure so that projection 38 enters hole 40 to thereby engage the link and blade.

Figure 10:
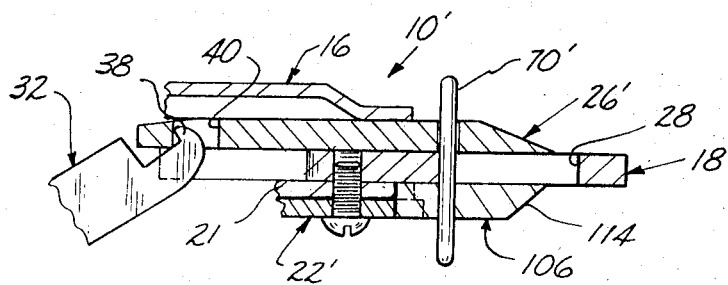
FIG. 10 is a vertical sectional view similar to that of FIG. 8 but showing the release pin and restraining button positioned to hold the cutting blade in its released or relatching position relative to the associated clipper structure.

In accordance with another feature of the present invention, the removal of blade 26 can be facilitated by manipulating handles 12 and 16 to partially extend blade 26 so that a release pin 70 (FIG. 5) can be inserted through a hole 74 in blade 26 and then releasing the handles so that blade 26 is retracted until pin 70 abuts on the rear edge of hole 28 in holder 18 (as shown in FIG. 5, or in FIG. 10 with respect to pin 70'). With pin 70 thus inserted in blade 26, link 32 is then pivoted to the disengaged position shown in phantom in FIG. 5 to thereby disengage it from the blade which can then be manually pulled out part way out through passage 24 with the aid of pin 70. Pin 70 is then removed from hole 74 to allow the blade to slide completely out of the passage.

It is to be noted that link 32 can be pivoted to release it from blade 26 in either of two ways. With the handles held apart by spring 30, the free end or tab 58 is depressed as described previously to pivot the link and thus disengage hook 38 from hole 40. Alternatively, with pin 70 inserted in blade hole 74 and the blade positioned as shown in FIG. 10, the handles 12 and 16 are pulled apart with sufficient force to cause edge 46 to slide up the wall of hole 40 until hook 38 has been cammed out of the hole. The angle of edge 46 is steep enough relative to hole 40, and the inclination of link 32 relative to blade 26 is shallow enough, so that this "pop out" action does not occur when the handles are being separated solely by the force of spring 30.

Pin 70 can also be used to position blade 26 in passage 24 when link 32 is manipulated to reconnect the blade with link 32. Hole 74 is located in blade 26 in such a position that when pin 70 is inserted through hole 74 and abuts the rear edge of hole 28, adequate clearance is provided between link 32 and cover 22 to allow the link to be pivoted sufficiently (as shown in phantom in FIG. 5) to disengage from the blade. When reconnecting link 32 to blade 26, this positioning of the blade by pin 70 registers hole 40 with projection 38 when handles 12 and 16 are in their partially separated condition as shown in FIG. 5, wherein extension 58 of link 32 is still accessible to apply finger pressure thereto to pivot the link to raise projection 38 over hole 40 and then allow it to drop into the hole.

Alternatively, hole 74 can be used merely as an indicator of blade position when reinserting blade 26, without using pin 70. This permits link 32 to be relatched to blade 26 while handles 12 and 16 are fully separated and extension or tab 58 is most accessible. To reinsert blade 26 following this alternative procedure, tab 58 is pushed toward handle 16 to raise hook 38 so that it will be clear of the blade. The blade is then slid into the guideway rear end first until hole 74 is no longer visible; i.e., hole 74 is just covered by the front edge of wall 17 wherein hole 74 is slightly to the right of its position as shown in FIG. 1. Then tab 58 is released to thereby permit hook 38 to contact the portion of blade surface 72 between hole 40 and rear face 69 of the blade. The handles are then squeezed together slowly to slide hook 38 forwardly on surface 72 until hook 38 drops into hole 40.

Figure 7:
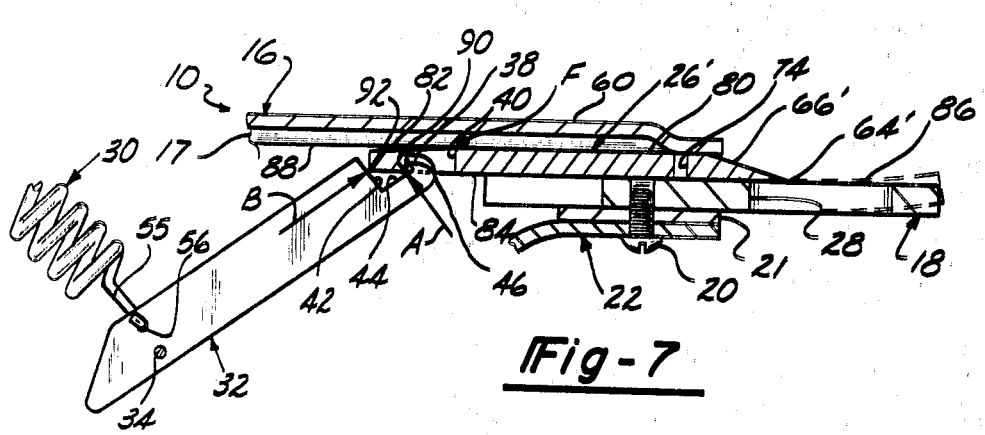
FIG. 7 is a fragmentary cross-sectional view similar to that of FIG. 1 but enlarged in scale thereover and illustrating a modified cutting blade of the invention incorporated in the nail clipper of FIGS. 1–6.

Referring to FIG. 7, the nose portion of clipper 10 is shown in vertical fragmentary section with a modified cutting blade 26' installed therein. Those elements identical to the structure described previously are given like reference numerals and the description thereof not repeated. Blade 26' differs from blade 26 in that the upper surface 80 of the blade, instead of being completely flat and parallel to the undersurface, has a slight curvature to present a convex surface 82 extending from the rear end of the blade to a point located forwardly of the line of force B and/or A applied by link 32, which normally will be forward of latch hole 40 indicated "F" in FIG. 7. The remainder of surface 80 from point F forward to the tapered cutting surface 66' may be flat and parallel to the bottom surface 84 of blade 26'. Alternatively the entire surface 80 may have a convex curvature although this is not necessary to achieve the blade canting or pivoting effect referred to hereinafter.

Preferably, blade 26' is made as a progressive die cut stamping from hardened spring steel and the blanking die is oriented so as to strike surface 84 in the stamping operation to separate the blade from the strip material from which it is being formed. When blade 26' is so produced, it will have a slight convex curvature on the side remote from which it is struck by the blanking die, particularly around the marginal edges of the blank. Hence, when blade 26' is made in this manner, no further operation is necessary to impart the desired curvature to surface 80 of blade 26'. Following such die stamping, blade 26' is ground flat on its surface 84 in conjunction with the formation of the tapered surface 66' to form its cutting edge 64°. The curvature of surfaces 80 and 82 resulting from the stamping operation will be both about a longitudinal axis of the blade as well as the transverse axis of the blade. However, it is the convex curvature about the transverse axis which is utilized in conjunction with link 32 to impart a couple to the blade which, as explained hereinafter, insures that its undersurface 84 adjacent its cutting edge 64° is forced closely against the upper surface 86 of the nail holder 18.

The interior surface 88 of the top wall 17 of the handle portion 16 of the clipper which extends in the direction of blade travel on either side of the groove defined by the rib 60 is preferably flat and extends in a straight line to provide a guideway in passageway 24 against which the upper surface 80 of blade 26' slides during its extension and retraction strokes.

It will be noted that when blade 26' is fully retracted as shown in FIG. 7, spring 30 acting on link 32 at hole 56 exerts a couple on link 32 which tends to pivot link 32 counterclockwise about pin 34 as viewed in FIG. 7 to thereby force the edge 44 of notch 36 of the link against the rear edge 90 of hole 40 where the hole intersects the undersurface 84 of blade 26'. Link 32 thus exerts a force on balde 26' in the direction of arrow A shown in FIG. 7 which tends to pivot blade 26' around the fulcrum F in a clockwise direction as viewed in FIG. 7. Since blade 26' has a slight assembly clearance in passageway 24, the forward end of blade 26' will be forced downwardly as viewed in FIG. 7 into firm sliding engagement with surface 86 of holder 18 even with blade 26' fully retracted. When the handles 12 and 16 are initially squeezed toward one another to produce the extension or cutting stroke of blade 26', the multiplication of forces through the moment arm of handle 12 about pivot 14 will push pin 32 via pin 34 in the direction of arrow B shown in FIG. 7, thereby adding much stronger force component to blade 26' via the sliding abutment of link edge 42 against the transversely extending lower rear corner edge 92 of blade 26'. Again, it will be seen that the force B is on the same side of fulcrum F as the force A, and hence this force acts to produce a couple about the fulcrum point F further tending to pivot blade 26' clockwise as viewed in FIG. 7, thereby augmenting the forces tending to hold the forward portion of the undersurface 84 of the blade tightly against surface 86 of holder 18. As blade 26' is extended by further squeezing of the clipper handles, the moment arm of force B relative to fulcrum F will decrease but the magnitude of this force will increase. The moment arm of force A about fulcrum F will not decrease as much as the force being exerted by spring 30 as it is stretched will also increase force A. Moreover, once the cutting edge 64' of the blade bites into the work being cut the magnitude of force B will further increase due to the natural inclination of the operator to squeeze harder on the handles. Hence, the couple produced via the engagement of edge 42 with edge 92 and edge 44 with edge 90 will tend to increase with blade extension. Moreover, once the cutting edge 64' bites into the work, the taper of surface 66' will tend to cam the forward edge of blade 26 tightly against surface 86, and will also provide another fulcrum against which the pivoting force is exerted by link 32 to maintain the tight mesh of the forward edge of the cutting blade with the blade holder.

As a result of the above fulcruming of the blade and its canting action on the cutting stroke, a very powerful and efficient cutting action is obtained, requiring less force to squeeze the handles together to cut a given object. This is a particularly desirable feature with a guillotine type cutting instrument because with such an instrument the movable blade and the stationary blade must "set" or mesh together closely during the cutting stroke to be able to cut through an object with the hardness and toughness of a large dog's nail. If the movable and stationary blades are not set together reasonably close, the cutting action causes a ragged edge or the dog nail will break as it is cut. This "set" of the blades is further enhanced by putting a slight upward bend in the holder blade 18 as shown on an exaggerated scale by the broken lines in FIG. 7. Due to this self-meshing action a larger clearance between blade 26' and its guiding passage 24 can be tolerated without impairing cutting action, thereby reducing cost of manufacture of clipper 10 as well as overcoming deterioration in cutting performance which would otherwise occur with normal wear of the blade and its guideway.

The ability of the blade to rock or cant in its guideway results in another advantage when the blade is retracted. At this time the tilting forces are considerably reduced and actually slightly reversed as the hook of projection 38 engages the rear surface of hole 40 to pull the blade backward, at which time surface 42 disengages from surface 92 and likewise surface 44 from edge 90 due to the nose of hook 38 tending to ride down slightly in hole 40. Hence, the forward edge of blade 26' can tend to lift away from surface 86 during retraction of the blade. This in turn facilitates removal of the cutting blade from the work being cut. Also, because larger clearances are permitted between blade 26' and its guiding passageway 24, it is easier to slide the blade 26 back and forth in the passageway when link 32 is disengaged from the blade, which in turn facilitates removal of the cutting blade and insertion of a replacement blade.

It is to be understood that a similar canting action of blade 26' can be obtained by making upper blade surface 80 flat if guideway surface 88 is made convex on the portion thereof against which blade 26' travels to thereby provide the fulcrum F for the link forces to act about. However, it is easier and less expensive to impart the curvature to blade 26' than it is to the wall of the guideway and hence the embodiment as illustrated in FIG. 7 is presently preferred.

Figure 8:
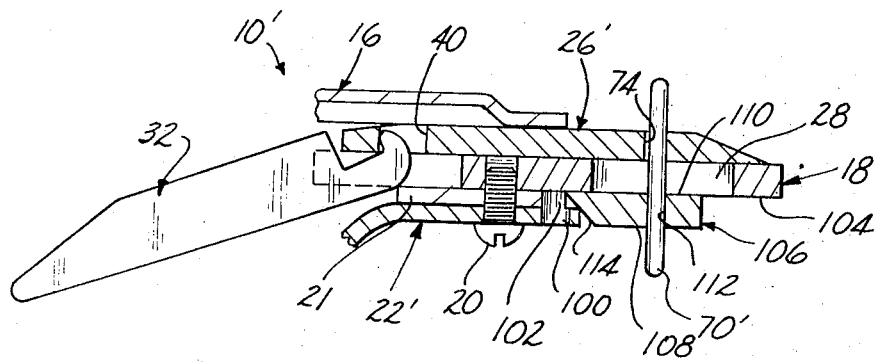
FIG. 8 is a view similar to that of FIG. 7 but further illustrating a modified clipper and release pin construction also in accordance with the present invention, with the pin shown in position to restrain the blade in an extended position to thereby hold the handles of the clipper in a partially collapsed condition.
Figure 9:
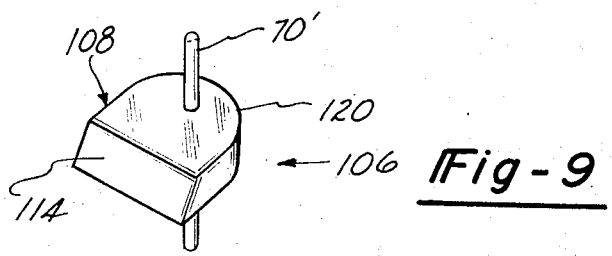
FIG. 9 is a perspective view of the release pin and restraining button of FIG. 8 shown by itself.

Referring to FIG. 8, a further embodiment of a clipper 10' is illustrated fragmentarily, most of the structure of which is similar to clipper 10 described previously. Clipper 10' differs from clipper 10 in that a modified cover 22' is provided having a concave front edge surface 100 )see FIGS. 8 and 11) and likewise the front edge of the inturned flanges 21 have a concave surface 102 coincident with surface 100. Also, the front edge 100 of cover 22' projects forwardly beyond the front edge 102 of flanges 21 to provide an overhang or space between the front edge of cover 22' and the undersurface 104 of holder 18. In accordance with another feature of the invention, clipper 10' is equipped with a modified blade release pin and handle locking button unit 106 which comprises a body 108 having a flat surface 110 adapted to lay flush against holder surface 104 as shown in FIG. 8. A release pin 70' is press fit through a hole 112 in body 108 and protrudes therefrom with its axis perpendicular to surface 110, and is insertable through the hole 74 in blade 26' as illustrated in FIG. 8. Body 108 has a tapering surface 114 inclined at about a 45° angle to surface 110 to form a retaining edge which enters under the projecting forward edge of cover 22 so as to impinge against the outer corners 116 and 118 (FIG. 11) of cover 22 when nested as shown in FIG. 8.

The retaining button 106 is used to hold the clipper handles 12 and 16 in a partially collapsed condition similar to that shown in FIG. 5 so that the clipper can be disabled and held in a more compact condition so as to occupy less space during shipment and storage. To insert retaining button 106 in its shipping position in the clipper, the handles are squeezed together until hole 74 of blade 26' is moved slightly forward of its position as shown in FIG. 8. Then pin 70' of the restraining unit 106 is inserted upwardly through hole 74 until the surface 110 of body 108 abuts the undersurface 104 of holder 18. Then the pressure on the handles is gradually released, allowing spring 30 to retract blade 26, carrying unit 106 with it until the tapered edge 114 of body 108 has nested beneath the overhang of cover 22 as shown in FIG. 8. The constant force exerted by spring 30 will thereafter retain unit 106 in this self-locking position so that the handles cannot be forced apart. When the clipper is removed from its package for initial use, squeezing of the handles together slightly will move the unit 106 forward with forward movement of blade 26', allowing pin 70' to be withdrawn from hole 74 and the unit 106 to be separated from clipper 10.

Figure 11:
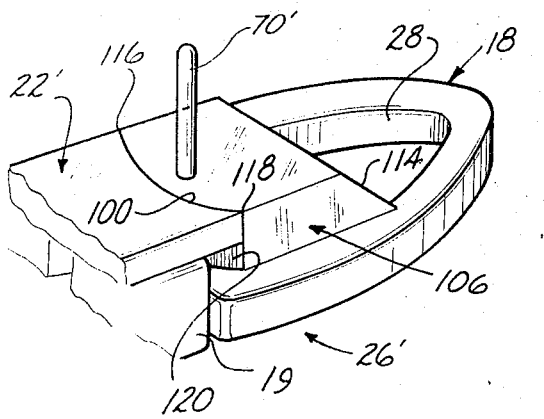
FIG. 11 is an enlarged fragmentary perspective view of the front end of the clipper inverted from its orientation in FIG. 1 and showing the release pin and restraining button in the position thereof shown in FIG. 10.

After removal of unit 106, the same is retained by the user until such time as it is desired to change blades. Then, unit 106 is turned 180 degrees so that its convexly curved surface 120, which is opposite the beveled edge 114, can nest in the concave recess provided by surfaces 100 and 102, as best seen in FIGS. 10 and 11. Since pin 70' is spaced closer to surface 120 than to surface 114, and since the curvature of surfaces 120 matches surfaces 100 and 102, pin 70' can move closer to the handle of the clipper and thus abut the rear edge of opening 28 in holder 18 as shown in FIG. 10. Hence, pin 70' is now positioned in the same relationship as pin 70 in FIG. 5, thereby positioning blade 26' so that the latch hole 40 thereof is located properly to receive the projection 38 of link 32 when connecting the same to blade 26', or for releasing the blade, as described previously. Pin 70' is also available as a convenient auxiliary tool to assist the user in pulling the blade out or pushing it in during the removal or replacement operation.

The use of an included angle on blade 26 or 26' of substantially 21° and the use of cold rolled spring steel having a Rockwell C hardness of between 57 and 60 on the D scale enables a strong blade edge 64' to be obtained which will not roll over or nick without requiring an extra microfinishing operation in the finishing of the blade edge. It has been found that a blade angle of 19° or less is too sharp to be made without an extra microfinishing operation. On the other hand, if the preferred angle of 21° is used, the cross-sectional area of the metal contained in the included angle at the nose of the blade will be 33 percent less than if the included angle were 30° as employed in certain prior art nail clippers, resulting in substantially improved cutting performance. For example, it can be demonstrated that a blade with a 30° angle or one even with a 25° angle will not penetrate a wooden dowel having a diameter of ⅜ inch without damaging the prior art clippers. However, with the improved blade 26', as specified herein, such a dowel can be readily cut clean through without damage to the clipper.

From the foregoing description, it will now be apparent that the releaseable latch arrangement of link 32 and blade 26 provides an improved nail clipper in which the blade can be manually removed and replaced without requiring any disassembly of the clipper components. This link and blade arrangement also provides a smoothly operating mechanism which tends to have a self-tightening blade. The clipper has a minimum number of moving parts which can be made of hardened steel to provide a maintenance free clipper having a long useful life. If desired, cover 22 can be permanently fixed to or formed integral with handle 16, and nail holder 18 can be permanently fixed to handle 16, thereby providing a nail clipper of economical manufacture and assembly.

I claim:

1. A clipper having a first handle, a blade receiving guideway, a work holder in said guideway and extending at one end therefrom, a second handle having a first pivot connection with said first handle at a point spaced laterally from said guideway, a cutting blade slidably received in said guideway for movement in cutting and retraction strokes and having a first surface slidably engaging one side of said holder, a link having a second pivot connection with said second handle at a point spaced rearwardly of said blade and intermediate said guideway and said first pivot connection, a tension coil spring connected at one end to said first handle and at the other end to said link at a point disposed between said second pivot connection and said guideway and on the side of said second pivot connection remote from said guideway, said link extending with its longitudinal axis at an oblique angle to the longitudinal axis of said blade, said link having a projection at the end thereof closest to said blade, said blade having an aperture with a marginal edge extending transverse to the direction of movement of said blade and adapted to receive said projection to releasably couple said link to said blade such that said projection engages said marginal edge to pull said blade in its retraction stroke and said link pushes against another marginal edge of said blade in its cutting stroke, said link having a manipulating extension projecting into the space defined between said handles on the side of said second pivot connnection remote from said blade to facilitate pivoting said link about the axis of said second pivot connection to disengage said link from said blade.

2. The clipper as set forth in claim 1 wherein said blade has a cutting edge formed on the forward end thereof adjacent the protruding end of said holder, said blade having a second aperture therethrough adjacent said cutting edge adapted to be exposed beyond said guideway when said blade is positioned in a release or latching position relative to said link.

3. The clipper as set forth in claim 2 wherein said clipper includes a retaining pin removably received through said second aperture in said blade and into a third aperture in said holder to hold said blade against retractile force exerted by said spring on said blade via said link.

4. The clipper as set forth in claim 3 wherein said retaining pin comprises a body adapted to seat against an exposed portion of said holder adjacent the forward end of said guideway, said clipper and body having interengaging means retaining said body in said seated position in response to said blade urging said body via said pin toward said guideway.

5. The clipper as set forth in claim 4 wherein said body has first and second spaced opposed edges, said pin being located intermediate said edges and closest to said second edge, said first edge being adapted to engage said guideway to hold said blade in an extended position wherein said handles are at least partially collapsed toward one another for retention thereof in a shipping position, said second body edge being adapted to engage said guideway to locate said pin relative thereto for positioning said blade in a release or latching position relative to said link.

6. The clipper as set forth in claim 1 wherein said blade has a cutting edge at its forward end and said first surface is flat and extends parallel to the direction of travel of said blade, said blade having a second surface opposite said first surface with at least a portion of said second surface being curved convexly to provide a fulcrum on said blade spaced rearwardly from the cutting edge and forwardly of said aperture which cooperates with a surface of said guideway in response to forces exerted on said blade by said link during the cutting stroke of said blade to pivot said blade in a direction to force said first surface thereof adjacent its cutting edge against the adjacent surface of said holder.

7. The clipper as set forth in claim 1 wherein said blade and said guideway have cooperative slidably interengaged surfaces at least one of which is curved convexly relative to the other to provide a fulcrum forwardly of the engagement point of said link with said blade whereby said blade is pivoted to force the cutting edge of said blade slidably against the adjacent surface of said holder as force is applied to said blade by said link in response to squeezing together of said handles.

8. The clipper as set forth in claim 1 wherein said link has a notch adjacent its forward end and said forward end terminates in said projection, said notch being defined by a first surface extending in the direction of the lingitudinal axis of said link and a second surface extending perpendicular thereto remote from said projection, said first notch surface being adapted to ride on an edge defined by the intersection of said aperture with said first blade surface, said second notch surface being adapted to slidably abut the rear edge of said blade at the intersection of its rear face and said first blade face during the application of force to said blade via said link in response to said handles being squeezed together.

9. In an animal nail clipper having a first handle, a nail holder extending from said first handle, a second handle pivotally carried by said first handle, and guide means to slidably mount a blade with respect to said nail holder to be extended over at least a portion of said nail holder to cut an animal nail received therein, the improvement comprising a blade adapted to be removably received in said guide means, a link pivotally connected to said second handle, latch means operably releasably interconnecting said link and said blade such that said blade is pushed by said link on its cutting stroke to cut a nail by squeezing said handles and said blade is pulled by said link on its retracting stroke by pivotally separating said handles, said link being pivotable to cause said latch means to uncouple said link from said blade, and abutment means positioned to engage said link to limit the extent to which said blade can be extended over said nail holder.

10. In an animal nail clipper having a first handle, a nail holder extending from said first handle, a second handle pivotally carried by said first handle, a guide means to slidably mount a blade with respect to said nail holder to be extended over at least a portion of said nail holder to cut an animal nail received therein, the improvement comprising a blade adapted to be removably received in said guide means, a link pivotally connected to said second handle, latch means operably releasably interconnecting said link and said blade such that said blade is pushed by said link on its cutting stroke to cut a nail by squeezing said handles and said blade is pulled by said link on its retraction stroke by pivotally separating said handles, said link being pivotable to cause said latch means to uncouple said link from said blade, said latch means comprising an aperture through said blade, a projection on said link adapted to extend into said aperture in said blade, and biasing means yieldably urging said projection of said latch into said aperture of said blade, and abutment means positioned to engage said link to limit the extent to which said blade can be extended over said nail holder.

11. A clipper having a first handle, a blade receiving guideway, a work holder in said guideway and extending at one end therefrom, a second handle having a first pivot connection with said first handle at a point spaced laterally from said guideway, a cutting blade slidably received in said guideway and having a first surface slidably engaging one side of said holder, a link having a second pivot connection with said second handle at a point spaced rearwardly of said blade and intermediate said guideway and said first pivot connection, a tension coil spring connected at one end to said first handle and at the other end to said link at a point disposed between said second pivot connection and said guideway and on the side of said second pivot connection remote from said guideway, said link extending with its longitudinal axis at an oblique angle to the longitudinal axis of said blade, said link having a projection at the end thereof closest to said blade, said blade having an aperture adapted to receive said projection to releasably couple said link to said blade, said link having a manipulating extension projecting into the space defined between said handles on the side of said second pivot connection remote from said blade to facilitate pivoting said link about the axis of said second pivot connection to disengage said link from said blade, said blade having a cutting edge formed on the forward end thereof adjacent the protruding end of said holder, said blade having a second aperture therethrough adjacent said cutting edge adapted to be exposed beyond said guideway when said blade is positioned in a release or latching position relative to said link, and a retaining pin removably received through said second aperture in said blade and into a third aperture in said holder to hold said blade against retractile force exerted by said spring on said blade via said link.

12. A clipper having a first handle, a blade receiving guideway, a work holder in said guideway and extending at one end therefrom a second handle having a first pivot connection with said first handle at a point spaced laterally from said guideway, a cutting blade slidably received in said guideway and having a first surface slidably engaging one side of said holder, a link having a second pivot connection with said second handle at a point spaced rearwardly of said blade and intermediate said guideway and said first pivot connection, a tension coil spring connected at one end to said first handle and at the other end to said link at a point disposed between said second pivot connection and said guideway and on the side of said second pivot connection remote from said guideway, said link extending with its longitudinal axis at an oblique angle to the longitudinal axis of said blade, said link having a projection at the end thereof closest to said blade, said blade having an aperture adapted to receive said projection to releasably couple said link to said blade, said link having a manipulating extension projecting into the space defined between said handles on the side of said second pivot connection remote from said blade to facilitate pivoting said link about the axis of said second pivot connection to disengage said link from said blade, said blade having a cutting edge at its forward end, said first surface being flat and extending parallel to the direction of travel of said blade, said blade having a second surface opposite said first surface with at least a portion of said second surface being curved convexly to provide a fulcrum on said blade spaced rearwardly from the cutting edge and forwardly of said aperture which cooperates with a surface of said guideway in response to forces exerted on said blade by said link during the cutting stroke of said blade to pivot said blade in a direction to force said first surface thereof adjacent its cutting edge against the adjacent surface of said holder.

13. A clipper having a first handle, a blade receiving guideway, a work holder in said guideway and extending at one end therefrom, a second handle having a first pivot connection with said first handle at a point spaced laterally from said guideway, a cutting blade slidably received in said guideway and having a first surface slidably engaging one side of said holder, a link having a second pivot connection with said second handle at a point spaced rearwardly of said blade and intermediate said guideway and said first pivot connection, a tension coil spring connected at one end to said first handle and at the other end to said link at a point disposed between said second pivot connection and said guideway and on the side of said second pivot connection remote from said guideway, said link extending with its longitudinal axis at an oblique angle to the longitudinal axis of said blade, said link having a projection at the end thereof closest to said blade, said blade having an aperture adapted to receive said projection to releasably couple said link to said blade, said link having a manipulating extension projecting into the space defined between said handles on the side of said second pivot connection remote from said blade to facilitate pivoting said link about the axis of said second pivot connection to disengage said link from said blade, said blade and said guideway having cooperative slidably interengaged surfaces at least one of which is curved convexly relative to the other to provide a fulcrum forwardly of the engagement point of said link with said blade whereby said blade is pivoted to force the cutting edge of said blade slidably against the adjacent surface of said holder as force is applied to said blade by said link in response to squeezing together of said handles.

14. A clipper having a first handle, a blade receiving guideway, a work holder in said guideway and extending at one end therefrom, a second handle having a first pivot connection with said first handle at a point spaced laterally from said guideway, a cutting blade slidably received in said guideway and having a first surface slidably engaging one side of said holder, a link having a second pivot connection with said second handle at a point spaced rearwardly of said blade and intermediate said guideway and said first pivot connection, a tension coil spring connected at one end to said first handle and at the other end to said link at a point disposed between said second pivot connection and said guideway and on the side of said second pivot connection remote from said guideway, said link extending with its longitudinal axis at an oblique angle to the longitudinal axis of said blade, said link having a projection at the end thereof closest to said blade, said blade having an aperture adapted to receive said projection to releasably couple said link to said blade, said link having a manipulating extension projecting into the space defined between said handles on the side of said second pivot connection remote from said blade to facilitate pivoting said link about the axis of said second pivot connection to disengage said link from said blade, said link having a notch adjacent its forward end and said forward end terminating in said projection, said notch being defined by a first surface extending in the direction of the longitudinal axis of said link and a second surface extending perpendicular thereto remote from said projection, said first notch surface being adapted to ride on an edge defined by the intersection of said aperture with said first blade surface, said second notch surface being adapted to slidably abut the rear edge of said blade at the intersection of its rear face and said first blade face during the application of force to said blade via said link in response to said handles being squeezed together.

15. The clipper as set forth in claim 14 wherein said blade comprises a generally thin, flat rectangular piece of hardened metal having a lengthwise dimension substantially longer than its width dimension, one end of said blade having a crescent shaped cutting edge defined by the intersection of said first blade surface with a tapering curved surface on the side of said blade opposite said first blade surface, said first blade surface being flat and being defined by said length and width dimensions, said rear edge of said blade aperture being disposed remote from said cutting edge and being spaced from the rear face of said blade.

16. The clipper as set forth in claim 15 wherein said blade has aperture means defining said aperture, said aperture means also having a front edge closest to said cutting edge and being adapted to receive a retaining pin therethrough adjacent said front edge, said front edge of said aperture means being oriented relative to said rear edge of said aperture to permit said front edge to remain exposed in a latching position of said blade and to permit said clipper to receive said pin.

17. The clipper as set forth in claim 16 wherein said aperture means comprises first and second holes spaced lengthwise of said blade, said first hole defining said aperture, said second hole being located adjacent said cutting edge and having a portion thereof defining the front edge of said aperture means.

18. The clipper as set forth in claim 15 wherein said blade surfaces are disposed to define an included angle therebetween of approximately 21°.

19. The clipper as set forth in claim 18 wherein said blade is made of cold rolled annealed spring steel having a rockwell C hardness on the D scale of between 57 and 60.

20. The clipper as set forth in claim 15 wherein said blade has a second surface on the side thereof remote from said first blade surface with at least a portion thereof having a convex curvature to provide a fulcrum point located intermediate said aperture and said cutting edge of said blade.

21. The clipper as set forth in claim 20 wherein said blade is a die blank stamping with said second surface being the surface disposed remote from the surface struck by a die punch during stamping of said blade.

22. In a clipper having a first handle, a work holder extending from said first handle, blade guide means having an end opening for receiving a blade endwise therein, a blade received endwise in said guide means via said end opening thereof and slidably mounted therein with respect to said holder so as to be extendable over at least a portion of said holder to cut the work received therein, a second handle pivotally carried by said first handle and pivotable away from said first handle so as to define a space between said handles in the retracted condition of said blade, a link pivotally connected to said second handle, latch means pivotally coupling said link with said blade such that said blade is pushed by said link in its cutting stroke to cut the work by squeezing said handles and said blade is pulled by said link in its retraction stroke by pivotally separating said handles, and spring means directly connected to said link to yieldably bias said handles apart for maintaining said blade in its retracted position, the improvement wherein said link has a first portion extending into the space between said handles and accessible therebetween for manual application of force to said link portion to pivot said link against the bias of said spring means to an unlatching position, said latch means releasably coupling said link and blade, said spring means yieldably maintaining said latch means in coupling relation with said link and blade, said latch means being operable to decouple said link and blade in response to movement of said link to said unlatching position whereby said blade is removable endwise via said end opening of said guide means, said latch means comprising an aperture through said blade and a projection on said link adapted to extend into said aperture in said blade, said spring means yieldably urging said projection of said latch into said aperture of said blade.

23. The clipper of claim 22 wherein said first portion of said link is at one end of said link and said projection is at the other end of said link, and wherein said link is pivoted to said second handle intermediate its ends such that manual application of sufficient force to said one end of said link to pivot said other end of said link away from said blade will release said latch means thereby disconnecting said link from said blade so that said blade can be removed from the clipper.

24. In a clipper having a first handle, a work holder extending from said first handle, blade guide means having an end opening for receiving a blade endwise therein, a blade received endwise in said guide means via said end opening thereof and slidably mounted therein with respect to said holder so as to be extendable over at least a portion of said holder to cut the work received therein, a second handle pivotally carried by said first handle and pivotable away from said first handle so as to define a space between said handles in the retracted condition of said blade, a link pivotally connected to said second handle, latch means pivotally coupling said link with said blade such that said blade is pushed by said link in its cutting stroke to cut the work by squeezing said handles and said blade is pulled by said link in its retraction stroke by pivotally separating said handles, and spring means directly connected to said link to yieldably bias said handles apart for maintaining said blade in its retracted position, the improvement wherein said link has a first portion extending into the space between said handles and accessible therebetween for manual application of force to said link portion to pivot said link against the bias of said spring means to an unlatching position, said latch means releasably coupling said link and blade, said spring means yieldably maintaining said latch means in coupling relation with said link and blade, said latch means being operable to decouple said link and blade in response to movement of said link to said unlatching position whereby said blade is removable endwise via said end opening of said guide means, said blade comprising a generally flat strip of metal, said latch means comprising an aperture through said blade adjacent one end thereof and a projection adjacent one end of said link adapted to extend into said aperture in said blade, said link being pivoted intermediate its ends with the other end thereof extending beyond the pivotal connection with said second handle such that said other end of said link is exposed in the space between said handles whereby finger pressure on said other end of said link is operable to pivot said link to thereby remove said projection from said aperture in said blade to disconnect said blade from said link for removal from the clipper, said spring means yieldably urging said projection of said link into said aperture of said blade.

25. The clipper of claim 24 which also comprises a second aperture through said blade adjacent the other end thereof adapted to receive a locating pin therethrough to facilitate removal of said blade from the nail clipper, said second aperture being oriented relative to said holder such that the pin can be engaged with a given portion of the holder in one position of said blade wherein said first aperture is positioned for ready release of said projection therefrom, said second aperture also being oriented as an indicator with reference to said holder for positioning said first aperture to receive said projection when coupling said blade with said link.

26. The clipper of claim 24 wherein said blade is of hardened steel and has a cutting edge with an included angle not substantially greater than 21°.

27. The clipper as set forth in claim 4 wherein said interengaging means of said body comprises an edge thereof adapted to engage said guideway to hold said blade in an extended position wherein said handles are at least partially collapsed toward one another for retention thereof in a shipping position, said pin comprising a projection extending perpendicularly to said body remote from said edge thereof, said body being reversible to permit said projection to be disposed closer to said guideway to locate said pin relative thereto for positioning said blade in a release or latching position relative to said link.

* * * * *